(12) United States Patent
Brune

(10) Patent No.: US 7,266,666 B2
(45) Date of Patent: Sep. 4, 2007

(54) METHOD FOR FAST VERIFICATION OF SECTOR ADDRESSES

(75) Inventor: Thomas Brune, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 341 days.

(21) Appl. No.: 10/857,255

(22) Filed: May 28, 2004

(65) Prior Publication Data

US 2005/0027924 A1  Feb. 3, 2005

(30) Foreign Application Priority Data

Jun. 5, 2003  (EP) .................................. 03012784

(51) Int. Cl.
 *G06F 12/00* (2006.01)
 *G11C 29/00* (2006.01)
(52) U.S. Cl. ...................... 711/200; 711/137; 711/154; 714/723
(58) Field of Classification Search ..................... None
 See application file for complete search history.

(56) References Cited

U.S. PATENT DOCUMENTS

| | | | | |
|---|---|---|---|---|
| 3,289,174 A | * | 11/1966 | Brown et al. ................. | 711/111 |
| 3,332,070 A | * | 7/1967 | Lucas et al. .................... | 711/4 |
| 3,346,852 A | * | 10/1967 | Smeltzer ........................ | 711/4 |
| 3,521,240 A | * | 7/1970 | Bahrs et al. .................... | 711/2 |
| 5,500,848 A | * | 3/1996 | Best et al. ................. | 369/275.3 |
| 5,625,840 A | | 4/1997 | Numata et al. ............. | 395/825 |
| 5,727,183 A | * | 3/1998 | Takahashi .................... | 711/143 |
| 5,768,236 A | * | 6/1998 | Kihara ................... | 369/124.14 |
| 6,449,714 B1 | * | 9/2002 | Sinharoy ..................... | 712/240 |
| 6,470,461 B1 | * | 10/2002 | Pinvidic et al. ................ | 714/8 |
| 6,691,213 B1 | * | 2/2004 | Luu et al. .................... | 711/163 |
| 6,906,989 B2 | * | 6/2005 | Furuhashi ................ | 369/53.17 |
| 6,968,423 B2 | * | 11/2005 | Coker et al. ................ | 711/113 |
| 7,047,477 B2 | * | 5/2006 | Tolhuizen et al. .......... | 714/768 |
| 7,092,333 B2 | * | 8/2006 | Morioka et al. ......... | 369/53.12 |
| 2002/0085836 A1 | * | 7/2002 | Geier et al. ................. | 386/125 |

FOREIGN PATENT DOCUMENTS

WO   93/03438   2/1993

OTHER PUBLICATIONS

Search Report Attached, Nov. 21, 2003.

* cited by examiner

*Primary Examiner*—Reginald Bragdon
*Assistant Examiner*—Shawn X. Gu
(74) *Attorney, Agent, or Firm*—Joseph J. Laks; Harvey D. Fried; Patricia Verlangieri

(57) ABSTRACT

The present invention relates to a method and a device for the fast verification of sector addresses in a data stream obtained from a recording medium upon a request from a microcontroller. According to the invention, the method comprises the steps of: reading the data stream from the recording medium; decoding the data stream to obtain a decoded data stream comprising user data and sector addresses; comparing the sector addresses with a range of valid sector addresses; and transmitting only user data having sector addresses within the range of valid sector addresses; whereby dedicated comparing means are provided for performing the comparing step independently of the microcontroller.

11 Claims, 1 Drawing Sheet

METHOD FOR FAST VERIFICATION OF SECTOR ADDRESSES

This application claims the benefit, under 35 U.S.C. 119, of German patent application No. 03012784.9 filed Jun. 05, 2003.

FIELD OF THE INVENTION

The present invention relates to a method and a device for the fast verification of sector addresses in a data stream obtained from a recording medium, and to an apparatus for reading from and/or writing to recording media using such method or device.

BACKGROUND OF THE INVENTION

In many of today's applications large amounts of data need to be stored. In the area of Personal Computers and in addition in the area of consumer electronics harddisks as fixed storage media and optical disks as removable storage media are commonly used for this purpose. Due to emerging incremental data bandwidth needs (HDTV, fast copy) the data throughput of the applications is increasing continuously. Consequently, the corresponding disk devices have to provide the appropriate data and data bandwidth, too. Therefore, a plurality of high density optical recording media have been developed, e.g. the Digital Versatile Disk (DVD) or the Blu-Ray Disk (BD) using blue laser light for reading and recording.

Data processing within storage devices can be separated into read and write paths. The logical processing blocks within a write path are as follows. A back-end interface (e.g. ATAPI) issues a 'WRITE' command and provides the appropriate data sectors to be written on the recording medium. These sectors are usually buffered or 'cached' into a memory. Afterwards they are reformatted into blocks of sectors, then error encoded and modulated, and finally written to the recording medium either magnetically (harddisk), optically (CD, DVD, BD), or magneto-optically (MOD).

The logical processing blocks within the read path are as follows. A back-end interface (e.g. ATAPI) issues a 'READ' command and waits for data sectors from the recording medium. A microcontroller decodes the back-end command (ATAPI command) to obtain the demanded sector address and calculates the corresponding physical address on the recording medium. The microcontroller then instructs a 'servo'-unit to position a read head (or pickup) at the appropriate physical address on the recording medium.

The position where the read head is placed does usually not coincide exactly with the desired position, e.g. due to mechanical tolerances or external influences like vibrations. If an unrequested sector address is found in the sector data, the read head needs to be repositioned very quickly until the requested sector address is found.

The data sectors read from the disc are modulated and combined to logical blocks. These blocks are error decoded and written into a buffer memory before the demanded sectors are sent to the back-end interface.

A problem of the above described processing is to arrange the buffer memory. The repositioning of the read head and external shocks lead to a fragmentation of the data in the buffer memory if no control mechanism is implemented. For this purpose a microcontroller analyses the data in the buffer memory for sending only the correct data to the back-end.

A control mechanism for arranging/aligning the data in the buffer memory checks the sector data content coming from the recording medium for those sector data addresses which were demanded. Only these sectors are written in the buffer. In order to send only well formatted data to the back-end, the arrangement of the sectors is preferably in incremental order without gaps.

To cover today's actual drive standards, in the following the sector addresses are called 'sector IDs'. That means for:

Harddisk physical low level ID (addressable with CSH or LBA)

| | |
|---|---|
| CD-DA | MinSecFrame within the Q-channel (msf) |
| CD-ROM | CD-ROM header |
| DVD | Sector ID |
| Blu-ray | address unit number (AUN) |

In known systems the sector IDs are checked directly by software by a microcontroller using software (firmware). This leads to a significant processing load on the microcontroller, since the sector ID check has to be done very frequently. For example, in a 1×DVD speed device the sector ID has to be checked approximately every 1,54 msec. In high speed devices, assuming for example 16×DVD, this checking has to be done approximately every 96 µsec. Consequently, a microcontroller in a high speed device like 16×DVD needs to have an interrupt frequency of ~96 µsec for reading every sector ID from the data stream, or it has to poll for this task with a frequency much higher then 1/96 µsec. This leads to an enormous workload for the microcontroller and reduces its performance for other tasks.

It is, therefore, an object of the invention to propose a method for the fast verification of sector IDs, which overcomes the above mentioned problems.

SUMMARY OF THE INVENTION

According to the invention, a method for the fast verification of sector addresses, whereby a data stream comprising sector addresses is obtained from a recording medium upon a request from a microcontroller, comprises the steps of:

reading the data stream from the recording medium;
decoding the data stream to obtain a decoded data stream comprising user data and sector addresses;
comparing the sector addresses with a range of valid sector addresses; and
transmitting only user data having sector addresses within the range of valid sector addresses;

whereby dedicated comparing means are provided for performing the comparing step independently of the microcontroller. Providing dedicated comparing means has the advantage that the workload of the microcontroller is greatly reduced. Consequently, its performance for other purposes is increased. Once the appropriate hardware units have been initialised according to the issued 'READ' command, the microcontroller is not needed for frequently checking the sector IDs. The microcontroller is only involved in error handling on missing sector IDs or sector IDs that are out of range.

Though the proposed hardware solution is less flexible than the known software solution with respect to the handling of incorrect sector ID's, it has been found that generally the error rate is sufficiently low and the hardware solution functions properly. To further increase the performance of the hardware solution, an additional block for enhancing the signal quality is preferably introduced in the read path. In case the error rate becomes too high, advantageously the data rate is reduced. If this does not lead to a sufficiently low error rate, the drive preferably switches to the known software solution, accepting the reduced performance.

Favourably, the method further comprises the step of preloading the range of valid sector addresses into the dedicated comparing means. This can, for example, be done by the microcontroller, which has to analyse the 'READ' command and calculate the corresponding addresses anyway.

Advantageously, the method further comprises the step of emitting a first interrupt signal to the microcontroller if the decoded sector addresses are outside the range of valid sector addresses. This interrupt signal is emitted after the last sector ID of the range of valid sector IDs has been read. In this case the reading is terminated with an 'end of command', since all requested sectors have been read. The microcontroller will then await further commands from the back-end.

According to another aspect of the invention, the method further comprises the step of performing a continuity check for verifying whether successive sector addresses are continuously incremental. As stated before, in order to send only well formatted data to the back-end, the arrangement of the sectors is preferably in incremental order without gaps. This is ensured by the continuity check.

Favourably, the method further comprises the step of providing the continuity check with an error tolerance for invalid sector addresses. Especially in CD systems errors in the sector ID occur, because the sector IDs are not very well error protected by special algorithms. In this case the continuity check is tolerant for occasional invalid IDs. Preferably an originally invalid sector address is deemed valid if at least the successive sector address is valid, i.e. in the valid range of sector IDs and continuous. This prevents the erroneous detection of invalid sector addresses.

Advantageously, a second interrupt signal is sent to the microcontroller if the continuity check fails, the second interrupt signal indicating a process error. Failure of the continuity check is a strong indication of read errors. When the second interrupt signal is emitted, the microcontroller has to decide how to proceed. A possibility is to read the corresponding sectors once again from the recording medium.

Favourably, the method further comprises the step of picking and holding the sector addresses from the decoded data stream for verification. This will give the dedicated comparing means sufficient time to perform the comparing step, especially at high data rates.

Advantageously, a device for the fast verification of sector addresses, whereby a data stream comprising sector addresses is obtained from a recording medium upon a request from a microcontroller, comprises means for performing a method according to the invention.

Furthermore, a method or a device according to the invention are favourably used in an apparatus for reading from and/or writing to recording media for the fast verification of sector addresses.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
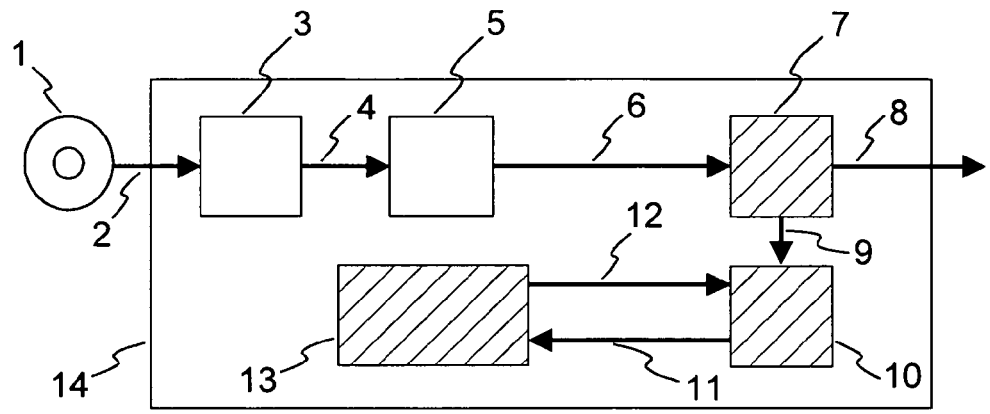
FIG. 1 shows a schematic illustration of a drive for a recording medium.

FIG. 1 shows a schematic illustration of a drive for a recording medium 1, e.g. an optical recording medium or a hard disk. The processing blocks 7, 10, 13 related to the invention are hatched. The system is split into the physical recording medium 1 and the data processing hardware unit 14, which is also referred to as the front-end IC.

A serial bit data stream 2 is read from the recording medium 1 by an acquisition block 3. In this block the data are synchronized with the unit's system clock. Typically the synchronized data 4 are provided to an error correction block 5, e.g. a Reed-Solomon error correction block, in a parallel manner. The error correction block 5 separates all user data and sector ID information 6, 8 from the channel data stream 2, 4. An additional block 7 picks and holds the current sector ID 9 out of the remaining user data stream 6 for checking for its validity.

User data 8 having a valid sector ID are then provided to an interface (not shown) to a system back-end (not shown) either directly or via a buffer (not shown).

To reduce the workload of a system microcontroller 13 an ID-compare block 10 is provided, which is preloaded with a valid sector ID range 12 by the microcontroller 13. The ID-compare block autonomously checks for the validity of the sector IDs 9 and only sends an interrupt signal 11 to the microcontroller 13 in case of an invalid sector ID 9.

The ID-compare block 10 additionally provides a continuity check. This functionality checks for incremental sector IDs 9. In case successive sector IDs 9 are not incremental, an appropriate interrupt signal 11 is sent to the microcontroller 13.

In the ID-compare block 10 error tolerant algorithms are employed due to the possibility of sector ID errors. Especially in CD systems errors in the sector ID occur, because the sector IDs are not very well error protected by special algorithms. In this case the continuity check is tolerant for occasional invalid IDs 9 and declares the corresponding data valid if the next sector IDs 9 are in the expected range 12.

Figure 2:
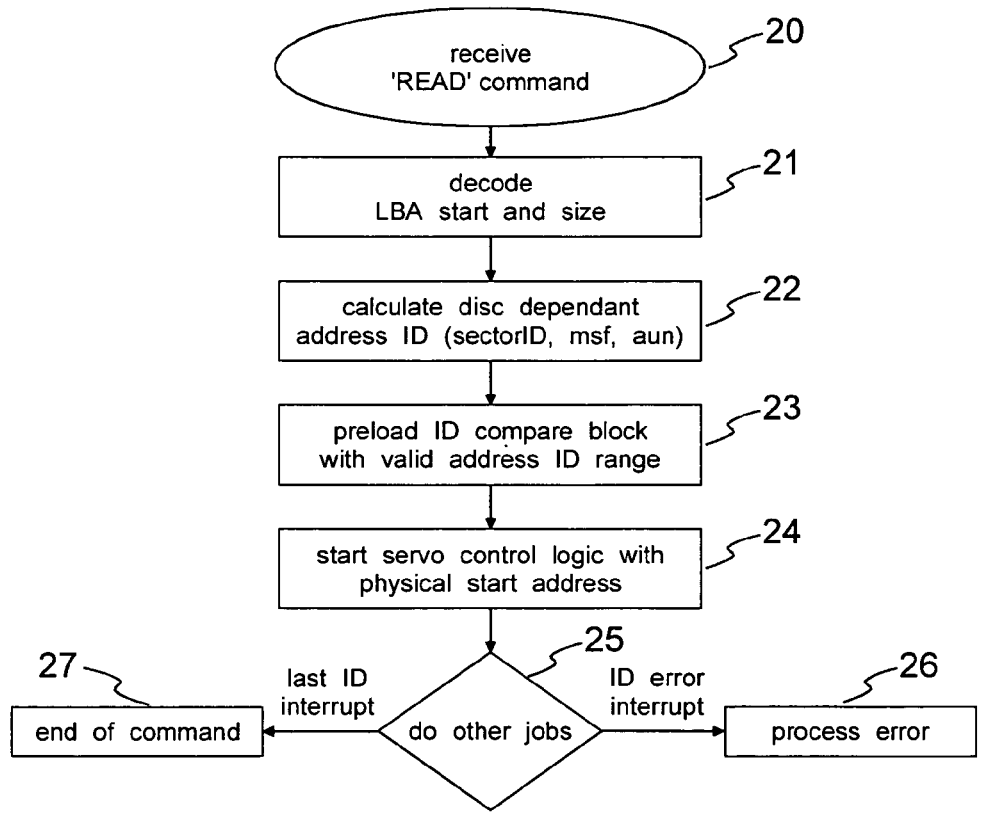
FIG. 2 shows a flow chart of a method according to the invention.

In FIG. 2 a flow chart of a method according to the invention is shown. Assuming without limitation that an ATAPI interface is used for the drive, upon receiving 20 a 'READ' command the firmware running on the microcontroller 13 decodes 21 the start 'logical block address' (LBA) and the end LBA from the ATAPI command. The start LBA is translated 22 into the physical recording medium or system dependant address domain for a servo application.

The start LBA and the end LBA are further translated 22 into the appropriate sector IDs. The start and the end sector ID are then loaded 23 into the ID-compare block 10 to define the valid sector ID range 12. Finally the physical start address is transmitted 24 to the servo application to start reading from the recording medium.

After this the microcontroller 13 is free for other jobs 25. In case of an ID error, i.e. if the continuity check of the sector IDs fails, an interrupt signal is transmitted to the microcontroller 13 and the reading is terminated with a 'process error' 26. Furthermore, in case the sector IDs in the data stream are outside the valid sector ID range 12, i.e. after the last sector ID of the valid sector ID range 12 has been read, also an interrupt signal is transmitted to the microcontroller 13. However, in this case the reading is terminated with an 'end of command' 27.

What is claimed is:

1. Method for the fast verification of sector addresses, whereby a data stream including sector addresses is obtained from a recording medium upon a request from a microcontroller, the method including the steps of:
   reading the data stream from the recording medium;
   decoding the data stream to obtain a decoded data stream including user data and sector addresses;
   comparing the sector addresses with a range of valid sector addresses independently of the microcontroller by using dedicated comparing means;
   transmitting only user data having sector addresses within the range of valid sector addresses;
   wherein it further includes the step of:
   preloading the range of valid sector addresses into the dedicated comparing means.

2. Method according to claim 1, further including the step of emitting a first interrupt signal to the microcontroller if the decoded sector addresses are outside the range of valid sector addresses.

3. Method according to claim 1, further including the step of performing a continuity check for verifying whether successive sector addresses are continuously incremental.

4. Method according to claim 3, further including the step of providing the continuity check with an error tolerance for invalid sector addresses.

5. Method according to claim 4, wherein an originally invalid sector address is deemed valid if one or more of the successive sector addresses are valid.

6. Method according to claim 3, further including the step of emitting a second interrupt signal to the microcontroller if the continuity check fails, the second interrupt signal indicating a process error.

7. Method according to claim 1, further including the step of picking and holding the sector addresses from the decoded data stream for verification.

8. Apparatus for reading from and/or writing to recording media, wherein it is adapted to use a method according to any one of claims 1 to 7 for the verification of sector addresses.

9. Device for the fast verification of sector addresses, whereby a data stream including sector addresses is obtained from a recording medium upon a request from a microcontroller, the device including:
   means for reading the data stream from the recording medium,
   means for decoding the data stream to obtain a decoded data stream including user data and sector addresses, and
   dedicated comparing means for comparing the decoded sector addresses with a range of valid sector addresses independently of the microcontroller,
   wherein it further includes means for preloading the range of valid sector addresses into the dedicated comparing means.

10. Device according to claim 9, further including means for picking and holding the sector addresses from the decoded data stream for verification.

11. Apparatus for reading from and/or writing to recording media, wherein it includes a device according to any one of claims 9 and 10 for the verification oil sector addresses.

* * * * *